US009683486B2

United States Patent
Eisterlehner et al.

(10) Patent No.: US 9,683,486 B2
(45) Date of Patent: Jun. 20, 2017

(54) BELT DRIVE ARRANGEMENT

(71) Applicant: Bayerische Motoren Werke Aktiengesellschaft, Munich (DE)

(72) Inventors: Leopold Eisterlehner, Steinbach an der Steyr (AT); Friedrich Tischberger, Dietach (AT); Christian Bramberger, Behamberg (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 14/612,582

(22) Filed: Feb. 3, 2015

(65) Prior Publication Data

US 2015/0148160 A1 May 28, 2015

Related U.S. Application Data

(63) Continuation of application No. PCT/EP2013/065929, filed on Jul. 29, 2013.

(30) Foreign Application Priority Data

Aug. 10, 2012 (DE) ........................ 10 2012 214 235

(51) Int. Cl.
*F16H 7/00* (2006.01)
*F16H 7/08* (2006.01)
(Continued)

(52) U.S. Cl.
CPC .............. *F02B 67/06* (2013.01); *F16H 7/08* (2013.01); *B60K 2025/022* (2013.01); *F16H 7/02* (2013.01)

(58) Field of Classification Search
CPC .... F02B 67/06; F02B 2275/06; F16H 7/1236; F16H 2007/081; F16H 7/02
(Continued)

(56) References Cited

U.S. PATENT DOCUMENTS 4,270,906 A * 6/1981 Kraft ....................... F02B 67/06
198/813
4,283,182 A * 8/1981 Kraft ..................... F16H 7/1236
474/110
(Continued)

FOREIGN PATENT DOCUMENTS

CN 1592825 A 3/2005
CN 201794662 U 4/2011
(Continued)

OTHER PUBLICATIONS

Chinese Office Action issued in counterpart Chinese Application No. 201380027290.2 dated Mar. 24, 2016 with English-language translation (twenty-seven (27) pages).
(Continued)

*Primary Examiner* — Henry Liu
(74) *Attorney, Agent, or Firm* — Crowell & Moring LLP

(57) ABSTRACT

A belt drive arrangement for an internal combustion engine, includes a drive pulley which is driven by a crankshaft of the internal combustion engine, a first output pulley with which a first auxiliary unit can be driven, a second output pulley with which a second auxiliary unit can be driven, and a belt which has an inner face and an outer face opposite the inner face and which loops at least some portions of the drive pulley and the output pulleys as a belt transmission. The inner face of the belt loops the drive pulley and the first output pulley while physically contacting same, and the outer face loops the second output pulley while physically contacting same. An internal combustion engine is provided with such a belt drive arrangement.

20 Claims, 2 Drawing Sheets

(51) Int. Cl.
*F16H 7/22* (2006.01)
*F16H 7/12* (2006.01)
*F02B 67/06* (2006.01)
*F16H 7/02* (2006.01)
*B60K 25/02* (2006.01)

(58) Field of Classification Search
USPC .......................................... 474/87, 101, 135
See application file for complete search history.

(56) References Cited

U.S. PATENT DOCUMENTS

| | | | | | |
|---|---|---|---|---|---|
| 4,355,991 | A | * | 10/1982 | Kraft | F02B 67/06 474/110 |
| 4,392,840 | A | * | 7/1983 | Radocaj | F16H 7/1272 474/117 |
| 4,411,638 | A | * | 10/1983 | Wilson | F16H 7/1236 474/110 |
| 4,466,803 | A | * | 8/1984 | Wilson | F16H 7/1236 188/285 |
| 4,473,362 | A | * | 9/1984 | Thomey | F02B 67/06 267/136 |
| 4,525,153 | A | * | 6/1985 | Wilson | F16H 7/1236 188/285 |
| 4,536,172 | A | * | 8/1985 | Burris | F16H 7/1236 474/135 |
| 4,563,167 | A | * | 1/1986 | Foster | F16H 7/1236 474/115 |
| 4,571,223 | A | * | 2/1986 | Molloy | F16H 7/1281 474/112 |
| 4,601,683 | A | * | 7/1986 | Foster | F16H 7/1236 474/110 |
| 4,634,408 | A | * | 1/1987 | Foster | F16H 7/1236 474/135 |
| 5,156,573 | A | * | 10/1992 | Bytzek | F02B 67/06 192/41 S |
| 5,277,666 | A | * | 1/1994 | Kumm | F16H 7/1236 474/133 |
| 5,405,296 | A | * | 4/1995 | Cerny | F16F 15/126 464/89 |
| 5,439,420 | A | * | 8/1995 | Meckstroth | F02B 67/06 474/133 |
| 7,004,864 | B2 | * | 2/2006 | Hotta | F02B 67/06 474/117 |
| 2003/0004023 | A1 | * | 1/2003 | Hotta | F02B 67/06 474/101 |
| 2003/0104886 | A1 | * | 6/2003 | Gajewski | F01L 1/02 474/87 |
| 2006/0288969 | A1 | * | 12/2006 | Thomas | F16H 7/24 123/41.49 |
| 2008/0121445 | A1 | | 5/2008 | Palladino | |
| 2012/0178563 | A1 | * | 7/2012 | Lee | F16H 7/1281 474/110 |

FOREIGN PATENT DOCUMENTS

| | | |
|---|---|---|
| CN | 202284500 U | 6/2012 |
| CN | 102588097 A | 7/2012 |
| DE | 32 39 706 T1 | 10/1983 |
| DE | 82 00 481 U1 | 1/1985 |
| DE | 692 06 888 T2 | 5/1996 |
| DE | 35 46 901 C2 | 2/1997 |
| DE | 197 45 735 A1 | 4/1999 |
| DE | 694 23 783 T2 | 11/2000 |
| DE | 102 26 377 A1 | 1/2003 |
| DE | 10 2006 027 431 A1 | 12/2006 |
| DE | 10 2008 026 064 A1 | 12/2009 |
| DE | 10 2011 050 061 A1 | 7/2012 |
| EP | 1 752 645 A2 | 2/2007 |
| WO | WO 2008/117542 A1 | 10/2008 |

OTHER PUBLICATIONS

International Search Report (PCT/ISA/210) dated Dec. 4, 2013 with English translation (seven pages).
German Search Report dated Dec. 17, 2012 with partial English translation (10 pages).
Chinese Office Action issued in counterpart Chinese Application No. 201380027290.2 dated Dec. 9, 2016 with English-language translation (thirteen (13) pages).

* cited by examiner

BELT DRIVE ARRANGEMENT

CROSS REFERENCE TO RELATED APPLICATIONS

This application is a continuation of PCT International Application No. PCT/EP2013/065929, filed Jul. 29, 2013, which claims priority under 35 U.S.C. §119 from German Patent Application No. 10 2012 214 235.5, filed Aug. 10, 2012, the entire disclosures of which are herein expressly incorporated by reference.

BACKGROUND AND SUMMARY OF THE INVENTION

The invention relates to a belt drive arrangement for an internal-combustion engine, comprising a drive pulley, which is driven by a crankshaft of the internal-combustion engine; a first output pulley, by which a first auxiliary unit can be driven; a second output pulley, by which a second auxiliary unit can be driven; and an endless belt, which has an inner face and an outer face opposite the inner face and, as a continuously variable transmission, loops the drive pulley and the output pulleys at least in sections. Furthermore, the invention relates to an internal-combustion engine having such a belt drive arrangement.

In current vehicle construction, a fairly large number of auxiliary units are necessary which are not or only to a limited extent required for the forward movement of the vehicle. Such auxiliary units are, for example, the cooling water circulating pump, which circulates the coolant of the engine and thereby contributes to the automatic control of the engine temperature; the generator or the alternator, which are required for supplying the electric onboard power supply system; the refrigerant compressor, which is used for the operation of the air-conditioning system; hydraulic pumps for the operation of a power steering system; ventilators for the radiator, etc. The auxiliary units are driven by way of drive pulleys or drive wheels of the crankshaft of the internal-combustion engine. In current motor vehicle construction, belt drives are used which transmit the driving power from the crankshaft to the auxiliary units. Deflection pulleys are required for ensuring a sufficient looping around the drive pulleys of the auxiliary units. Only if the belt sufficiently loops around the drive or output pulleys can a sufficient adhering contact be ensured between the belt and the drive or output wheel and, thereby, a sufficient transmission of torques and powers. However, such auxiliary drive arrangements known from the state of the art have the disadvantage that the use of deflection pulleys increases the expenditures for the mounting and, in addition, has a disadvantageous effect on the space requirement of the engine.

Based on this state of the art, it is an object of the invention to provide a simplified method by which the disadvantages of the state of the art can be overcome. It is a further object of the invention to provide a belt drive arrangement or an internal-combustion engine having such a belt drive arrangement, with reduced mounting expenditures and a reduced packaging requirement.

These and other objects are achieved by a belt drive arrangement for an internal-combustion engine comprising a drive pulley which is driven by a crankshaft of the internal-combustion engine, a first output pulley by which a first auxiliary unit can be driven, a second output pulley by which a second auxiliary unit can be driven, and an endless belt. The belt has an inner face and an outer face opposite the inner face and, at a continuously variable transmission, loops the drive pulley and the output pulleys, as least in sections. Furthermore, the inner face of the belt loops the drive pulley and the first output pulley while physically contacting them, and the outer face of the belt loops the second output pulley while physically contacting it. In other words: with its inner face, the belt touches the drive pulley driven by the crankshaft, and a first output pulley driving a first auxiliary unit, and, with its outer face, touches the second output pulley, by which a second auxiliary unit is driven.

Furthermore, the looping of the output pulley may take place in a power-related manner, the first auxiliary unit, which is connected with the first output pulley, having a higher power, and the second auxiliary unit, which is connected with the second output pulley, having a lower power consumption. The higher the power consumption of an auxiliary unit, the higher also the load torque which this auxiliary unit generates in the belt drive.

According to the invention, the belt therefore loops drive pulleys with its inner face that are connected with auxiliary units representing a high load torque. Output pulleys, which are connected with an auxiliary unit that generates low load torques in the belt, are looped by the outer face or by the back of the belt. This has the advantage that a particularly space-saving belt drive arrangement can be implemented, in which case additional deflection pulleys are not necessary. This also results in a reduction of the overall weight of the engine as well as of the costs. Furthermore, frictional torques are reduced, which has an advantageous effect on the fuel consumption and not least on the $CO_2$ emission.

In addition, a tensioning roller may be arranged in the circling direction of the belt behind the second output pulley, which tensioning roller is looped at least in sections by the outer face of the belt. As a result, the auxiliary units may be arranged such that, at each unit, the looping angle is adapted to the power consumption or the load torque of the unit. This becomes possible by the positioning of the tensioning roller between an auxiliary unit generating a low load torque and an auxiliary unit generating a higher load torque. The function of the tensioning device in the looping direction behind an auxiliary unit with a low power consumption is made possible by the low induced load torque that is generated by the auxiliary unit.

Furthermore, the tensioning roller may be arranged between the first output pulley and the second output pulley. Such an arrangement of the tensioning roller in front of an auxiliary unit with a high load torque has the additional advantage that, in the case of a maximal loading of this auxiliary unit, the looping at the pertaining output pulley is increased. In other words, when the load torque of the auxiliary unit is increased, the belt is lengthened. The tensioning device adjusts and thereby increases the looping at the output wheel of the pertaining auxiliary unit.

In addition, a third output pulley is provided which is connected with a third auxiliary unit, the third output pulley being looped by an inner face of the belt.

Furthermore, the belt may form an essentially L-shaped circling path in the installed condition.

The first auxiliary unit may be a generator, and the second auxiliary unit may be a cooling water circulating pump.

Furthermore, the third auxiliary unit may be constructed as a refrigerant compressor.

In a further aspect, the invention relates to an internal-combustion engine for a motor vehicle which comprises an above-described belt drive arrangement.

In the following, the invention will be explained in detail by means of the description of the figures. The claims, the figures and the description contain a plurality of characteristics which in the following are explained by means of embodiments of the present invention described as examples. A person skilled in the art will also consider these characteristics individually and in other combinations in order to form additional embodiments which are adapted to corresponding applications of the invention.

DETAILED DESCRIPTION OF THE DRAWINGS

Figure 1:
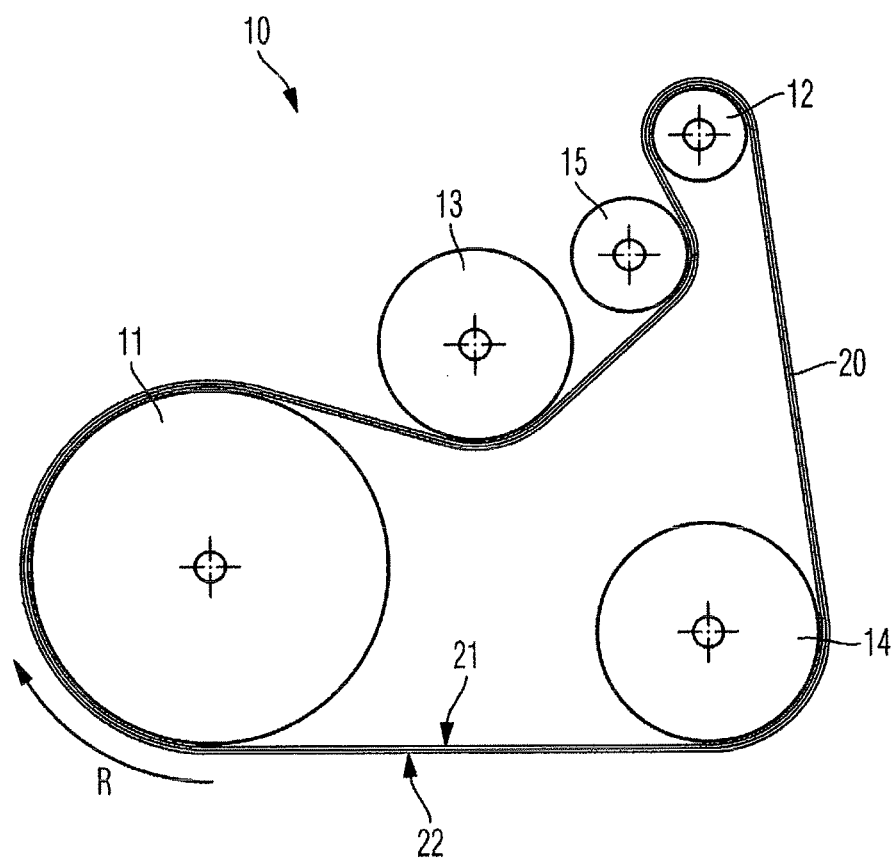
FIG. 1 is a schematic lateral view of a belt drive arrangement according to an embodiment of the invention.
Figure 2:
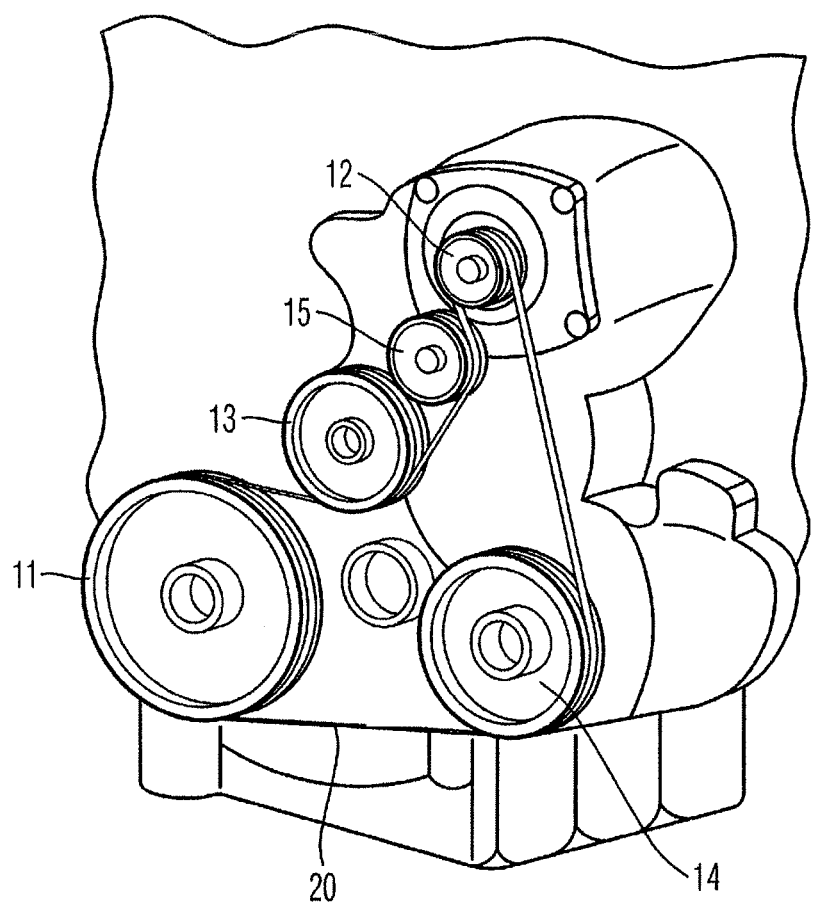
FIG. 2 is a schematic perspective view of a belt drive arrangement according to an embodiment of the invention.

In the following, the invention will be explained in detail by means of the figures. The belt 20 is designed as a closed endless belt and has an inner face 21 and an outer face 22. By means of its inner face 21, the belt 20 loops a drive wheel 11, which is non-rotatably connected with a crankshaft of an internal-combustion engine (not illustrated) as is well-known in the art. By means of the rotation of the crankshaft, the drive wheel 11 is rotated and the belt 20 is taken along in the circling direction R. By means of its inner face 21, the belt 20 further loops a first output wheel 12 and a third output wheel 14. By means of its outer face 22, the belt loops a second output wheel 13 and a tensioning roller 15. The output wheels 12, 13, 14 are non-rotatably or by way of a free wheel connected with one auxiliary unit, respectively. In a preferred embodiment of the invention, the first drive wheel 12 is connected with a generator, the second drive wheel 13 is connected with a cooling water circulating pump, and the third drive wheel 14 is connected with a refrigerant compressor.

As a result of the rotating movement of the belt 20 in the circling direction, the output wheels 12, 13, 14 are caused to rotate, which drives the auxiliary units.

The belt 20 may be a toothed belt, a V-belt or a V-ribbed belt. The teeth or the ribs are arranged on the inner face 21 or the front side of the belt. The outer face 22 or the back side of the belt will then generally have no elevation and have a flat construction. As an alternative, the surface of the back 22 of the belt may also be roughened, be provided with a structure or may be constructed analogous to the inner face 21. At the drive wheel 11 or at the output wheels 12, 14, which are looped by the belt 20 by means of its inner face 21, particularly high torques can be transmitted from the belt 20 to the wheels or from the wheels to the belt 20. Since the second output wheel 13 is looped by the outer face 22 of the belt 20 being in physical contact with the output wheel 13, only a lower torque or a lower power can be transmitted here. As a result, according to the invention, a power-related arrangement of the auxiliary units is generated, in which case, auxiliary units which exercise a high load torque upon the belt 20 are looped by the inner face 21, and auxiliary units which induce a low load torque in the belt 20 are looped by the outside 22 of the belt 20. Because the drive torque is relatively high, the drive wheel 11 is also looped by means of the inner face of the belt.

Because of the low power consumption or the low load torque, which is exercised by the cooling water circulating pump upon the second output wheel 13, it becomes possible to arrange the tensioning roller 15 behind the cooling water circulating pump or behind the second output wheel 13 in the circling direction R of the belt 20. This results in advantages in that the residual auxiliary units can be arranged in a space-saving manner, and that, in the case of a maximal power consumption by the generator, the amount of looping of the output wheel 12 connected with the generator 12 can be increased in order to reduce slip effects. Because of the space-saving arrangeability of the further auxiliary units, there remains more installation space, which can be used for other components, such as exhaust recirculation systems and the like. A further advantage of this belt drive arrangement is the fact that, as a result of the reduced requirement of installation space, a shorter belt can be used. Shorter belts have the advantage of offering a lower vibration behavior and therefore have acoustic advantages over long belts.

As illustrated in FIG. 1, the belt 20 has an essentially L-shaped contour in its installed condition. The drive wheel 11, the first output wheel 12 and the third output wheel 14 are oriented with respect to one another so as to form a triangle. As a result of the positioning of the second output wheel 13 and the tensioning roller 15 according to the invention, the belt is deflected in the area between the drive pulley 11 and the output pulley 12, so that an essentially L-shaped course is obtained. The second output wheel 13 thereby acts as a deflection roller in the sense of an integration of functions. As a result, a sufficient tensioning force can be generated in the belt 20 while the installation space requirement is simultaneously reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A belt drive arrangement for an internal-combustion engine, comprising:
   a drive pulley, which is driven by a crankshaft of the internal-combustion engine;
   a first output pulley, by which a first auxiliary unit is drivable;
   a second output pulley, by which a second auxiliary unit is drivable; and
   an endless belt having an inner face and an outer face opposite the inner face, the belt looping the drive pulley and the first and second output pulleys at least in sections as a continuous belt transmission,
   wherein
   the second output pulley is located in a belt circling direction between the drive pulley and the first output pulley, and
   the inner face of the belt loops the drive pulley and the first output pulley in physical contact therewith, and the outer face of the belt loops the second output pulley in physical contact therewith.

2. The belt drive arrangement according to claim 1, wherein:
   the looping of the first and second output pulleys takes place in a power-related manner in which the first auxiliary unit when connected with the first output pulley and driven by the inner face of the belt has a higher maximal power consumption than the second auxiliary unit when the second auxiliary unit is connected with the second output and driven by the outer face of the belt.

3. The belt drive arrangement according to claim 1, further comprising:

a tensioning roller arranged in a circling direction of the belt behind the second output pulley, which tensioning roller is looped at least in sections by the outer face of the belt.

4. The belt drive arrangement according to claim 2, further comprising:
a tensioning roller arranged in a circling direction of the belt behind the second output pulley, which tensioning roller is looped at least in sections by the outer face of the belt.

5. The belt drive arrangement according to claim 4, wherein:
the tensioning roller is arranged between the first output pulley and the second output pulley.

6. The belt drive arrangement according to claim 3, wherein:
the tensioning roller is arranged between the first output pulley and the second output pulley.

7. The belt drive arrangement according to claim 1, further comprising:
a third output pulley, which is connected with a third auxiliary unit, the third output pulley being looped by an inner face of the belt.

8. The belt drive arrangement according to claim 5, further comprising:
a third output pulley, which is connected with a third auxiliary unit, the third output pulley being looped by an inner face of the belt.

9. The belt drive arrangement according to claim 7, wherein:
in an installed condition, the belt forms an essentially L-shaped circling path in a region laterally beside the drive pulley in which said output pulleys are arranged.

10. The belt drive arrangement according to claim 8, wherein:
in an installed condition, the belt forms an essentially L-shaped circling path in a region laterally beside the drive pulley in which said output pulleys are arrange.

11. The belt drive arrangement according to claim 1, wherein:
the first auxiliary unit is a generator and the second auxiliary unit is a cooling water circulating pump.

12. The belt drive arrangement according to claim 7, wherein:
the first auxiliary unit is a generator and the second auxiliary unit is a cooling water circulating pump.

13. The belt drive arrangement according to claim 12, wherein:
the third auxiliary unit is a refrigerant compressor.

14. The belt drive arrangement according to claim 11, wherein:
the third auxiliary unit is a refrigerant compressor.

15. An internal-combustion for a motor vehicle, comprising:
a crankshaft;
a belt drive arrangement for the internal-combustion engine, the belt drive arrangement comprising:
a drive pulley, which is driven by a crankshaft of the internal-combustion engine;
a first output pulley, by which a first auxiliary unit is drivable;
a second output pulley, by which a second auxiliary unit is drivable; and
an endless belt having an inner face and an outer face opposite the inner face, the belt looping the drive pulley and the first and second output pulleys at least in sections as a continuous belt transmission,
wherein
the second output pulley is located in a belt circling direction between the drive pulley and the first output pulley, and
the inner face of the belt loops the drive pulley and the first output pulley in physical contact therewith, and the outer face of the belt loops the second output pulley in physical contact therewith.

16. The international-combustion engine according to claim 15, wherein:
the looping of the first and second output pulleys takes place in a power-related manner in which the first auxiliary unit when connected with the first output pulley and driven by the inner face of the belt has a higher maximal power consumption than the second auxiliary unit when the second auxiliary unit is connected with the second output and driven by the outer face of the belt.

17. The international-combustion engine according to claim 16, further comprising:
a tensioning roller arranged in a circling direction of the belt behind the second output pulley, which tensioning roller is looped at least in sections by the outer face of the belt.

18. The international-combustion engine according to claim 17, wherein:
the tensioning roller is arranged between the first output pulley and the second output pulley.

19. The international-combustion engine according to claim 18, further comprising:
a third output pulley, which is connected with a third auxiliary unit, the third output pulley being looped by an inner face of the belt.

20. The international-combustion engine according to claim 19, wherein
the third auxiliary unit is a refrigerant compressor.

* * * * *